(12) United States Patent
Inoue et al.

(10) Patent No.: US 6,846,050 B2
(45) Date of Patent: Jan. 25, 2005

(54) HYDRAULIC UNIT FOR AN ANTI-LOCK VEHICLE BRAKE SYSTEM

(75) Inventors: Isao Inoue, Yokohama (JP); Michael Schlitzkus, Dietmannsried (DE); Andreas Weh, Durach (DE); Douglas Patterson, Goose Creek, SC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/636,546

(22) Filed: Aug. 8, 2003

(65) Prior Publication Data

US 2004/0090115 A1 May 13, 2004

(30) Foreign Application Priority Data

Aug. 8, 2002 (DE) .......................................... 102 36 390
Aug. 8, 2002 (DE) ..................................... 202 12 237 U

(51) Int. Cl.[7] .............................................. B60T 8/36
(52) U.S. Cl. .............................. 303/119.3; 303/DIG. 10
(58) Field of Search ........................... 303/119.3, 119.2, 303/DIG. 10, DIG. 11

(56) References Cited

U.S. PATENT DOCUMENTS

| | | | | |
|---|---|---|---|---|
| 5,975,652 A | * | 11/1999 | Otto ......................... | 303/113.1 |
| 6,260,933 B1 | * | 7/2001 | Dinkel et al. ............. | 303/113.1 |
| 6,398,315 B1 | * | 6/2002 | Dinkel et al. ............. | 303/113.1 |
| 6,428,121 B1 | * | 8/2002 | Dinkel et al. ............. | 303/191 |
| 6,688,707 B1 | * | 2/2004 | Dinkel et al. ............. | 303/119.3 |
| 2004/0046446 A1 | * | 3/2004 | Dinkel et al. ............. | 303/119.3 |

FOREIGN PATENT DOCUMENTS

DE        19958194 A1 *  1/2001  ............. B60T/6/36

* cited by examiner

Primary Examiner—Robert A. Siconolfi
(74) Attorney, Agent, or Firm—Ronald E. Greigg

(57) ABSTRACT

The invention relates to a hydraulic unit for an anti-lock vehicle brake system, having a housing block with a first row of valve receiving chambers for receiving inlet valves, and a second row of valve receiving chambers for receiving outlet valves a pump receiving chamber, whose longitudinal axis extends at least approximately perpendicular to longitudinal axes of the valve receiving chambers and between the longitudinal axes of the valve receiving chambers of the first row and the longitudinal axes of the valve receiving chambers of the second row; low-pressure reservoir receiving chambers, which are disposed on a side, remote from the pump receiving chamber, of the valve receiving chambers of the second row, and whose longitudinal axis extends at least approximately perpendicular to the longitudinal axes of the valve receiving chambers and to the longitudinal axis of the pump receiving chamber; and a separate, direct connection between each valve receiving chamber of an outlet valve and an associated low-pressure reservoir receiving chamber.

19 Claims, 2 Drawing Sheets

HYDRAULIC UNIT FOR AN ANTI-LOCK VEHICLE BRAKE SYSTEM

BACKGROUND OF THE INVENTION

1. Field of the Invention

The invention relates to a hydraulic unit for an anti-lock vehicle brake system.

2. Description of the Prior Art

A hydraulic unit of a vehicle brake system, which unit converts the commands of an electronic control unit and via valves controls the pressures in wheel brakes independently of a driver, is described for instance in German Published, Unexamined Patent Disclosure DE 44 31 250 A1.

This known hydraulic unit has a housing block, in which a first row of upper stepped bores and a second row of lower stepped bores are made for receiving multiposition valves; one upper stepped bore and one lower stepped bore each communicate with one another and additionally with a brake line connection bore. The upper stepped bores for receiving a multiposition valve also communicate with a wheel brake connection that also communicates with a low-pressure reservoir acting as a damper. From the low-pressure reservoir, a bore leads to a pump receiving chamber, which communicates with a further low-pressure reservoir and with two lower stepped bores that are intended to receive outlet valves.

For each of the two brake circuits provided, one so-called primary circuit is formed with line connections from a master cylinder, which predetermines the brake pressure, to the wheel brakes via the inlet valves inserted into the upper valve receiving chambers, while the line connections from the wheel brakes to outlet valves inserted into the lower valve receiving chambers, to the low-pressure reservoirs, and the return pump inserted into the pump receiving chamber, form a secondary circuit for return pumping into the primary circuit.

A disadvantage of the housing block of the hydraulic unit known from DE 44 31 250 A1, with a disposition of the pump receiving chamber between the valve receiving chambers and the low-pressure reservoirs, is that the secondary circuit of a brake circuit holds a large volume of pressure fluid, as a result this demarcated region, which is not flushed out in normal braking but rather only in braking with regulation of brake fluid, can be ventilated only with difficulty.

Moreover, when there is a relatively large enclosed volume of pressure fluid in the secondary circuit, there is the risk of outgassing of the enclosed volume, for instance if no regulation takes place over a relatively long period of time during cold weather.

From German Published, Unexamined Patent Disclosure DE 199 58 194 A1, a hydraulic unit for a traction-controlled brake system is known, with a receiving body that in a plurality of valve receiving bores in a first and second row of valves receives inlet valves and outlet valves and has a pump bore, disposed between the valve receiving bores and low-pressure reservoir receiving chambers, which is oriented transversely to the direction of discharge of the valve receiving bores into the receiving body and centrally forms a unit with a motor receiving bore, which is oriented perpendicular to the pump bore. Between these receiving bores or chambers, pressure fluid conduits connecting them with one another are made in the receiving body, which are capable of making a hydraulic communication between brake pressure transducer connections, that lead into the receiving body, and wheel brake connections, that lead away from the receiving body. Each two valve receiving bores for outlet valves are coupled in pairs by means of pressure fluid conduits and each communicate with a low-pressure reservoir receiving chamber via a respective return conduit.

Once again, there is the disadvantage of a large volume of pressure fluid in the secondary circuits of the vehicle brake system.

Furthermore, the connections among the individual receiving chambers in the receiving housing is disadvantageous in the sense that for the most part they have angles, rather than extending in straight lines. Thus the course of pressure fluid from two valve receiving chambers for outlet valves to the associated low-pressure reservoir receiving chamber is formed with a bore that initially connects the valve receiving chambers and with a further bore extending perpendicular to it; the latter bore is composed of two bore portions: A first of these bore portions is made from outside into the receiving housing, axially parallel to a longitudinal axis of the valve receiving chambers, and a second bore portion is made in the receiving housing axially parallel to a longitudinal axis of the applicable low-pressure reservoir receiving chamber, in the direction of the first bore portion. The transition region between the bore portions forms a 90° angle.

Besides the high engineering cost and the fluidic disadvantages of a 90° angle of this kind, another factor is that each bore portion must be closed off from the outside, for instance by a ball-like closure element. Thus there is also the risk of a possible leak during the operating time, since these closures are exposed to pressure pulsation.

German Published, Unexamined Patent Disclosure DE 44 06 269 A1 discloses a housing of an anti-lock brake system installed in a diagonal brake system with two brake circuits. In this housing, a pump receiving chamber is disposed between a first row of inlet solenoid valves and a second row of outlet solenoid valves; two solenoid outlet valves communicate with one another via a pressure line, which in turn communicates with a reservoir that forms a pulsation damper, which is exposed to high pressure and is connected downstream of the pump.

This known arrangement is already intrinsically complicated because of its design with dampers. Moreover, once again there are the disadvantages of a course of pressure fluid via a conduit connecting the outlet solenoid valves, and a pressure fluid conduit branching off from it to the reservoir, with corresponding twists and turns.

OBJECT AND SUMMARY OF THE INVENTION

It is the object of the present invention to create a hydraulic unit for an anti-lock vehicle brake system in which the disposition of receiving chambers for a pump, valves and low-pressure reservoirs and the connections or communications between these elements in a housing block are optimized in such a way that a secondary circuit of the vehicle brake system holds a smaller volume of pressure fluid, and the hydraulic unit can be produced more compactly, simply, and economically.

The hydraulic unit of the invention which has a housing block with a first row of valve receiving chambers for receiving inlet valves and a second row of valve receiving chambers for receiving outlet valves, having a pump receiving chamber whose longitudinal axis is oriented at least approximately perpendicularly to longitudinal axes of the valve receiving chambers and extends between the longitudinal axes of the valve receiving chambers of the first row and the longitudinal axes of the valve receiving chambers of the second row, having low-pressure reservoir receiving chambers, which are disposed on a side, remote from the pump receiving chamber, of the valve receiving chambers of the second row and whose longitudinal axis extends at least approximately perpendicularly to a longitudinal axis of the valve receiving chambers and to the longitudinal axis of the pump receiving chamber, and having a separate, direct connection between each valve receiving chamber of an outlet valve and an associated low-pressure reservoir receiving chamber, has the advantage that the pressure fluid volume in a secondary circuit of the vehicle brake system is reduced significantly, compared to known embodiments.

The reduction in the pressure fluid volume accomplished by positioning the valve receiving chambers of the outlet valves in the vicinity of the low-pressure reservoir receiving chambers, in the secondary circuit that is incorporated into the brake circuit only a regulated braking operation, makes it possible to improve the ventilation in various installed positions and to reduce the risk of outgassing of an enclosed volume.

Because the pump receiving chamber is disposed directly between the row of outlet valves and the row of inlet valves, the housing block can advantageously be embodied with a lesser housing thickness in the axial direction of the valves.

Besides reducing the structural size, the direct connection between each valve receiving chamber of an outlet valve and a low-pressure reservoir receiving chamber advantageously also reduces the number of components, since fewer closures have to be provided for lines that lead to the outside of the housing block.

In an embodiment of the invention that is simple in terms of production, with less machine cutting effort, the separate, direct connection between each valve receiving chamber of an outlet valve and an associated low-pressure reservoir receiving chamber is embodied as a straight bore that leads directly from the receiving chamber of an outlet valve into the applicable low-pressure reservoir receiving chamber.

To improve the ventilation of the low-pressure reservoir, a further separate connection can be provided between the low-pressure reservoir receiving chamber and the pump receiving chamber; this connection is disposed with its longitudinal axis preferably axially parallel and eccentrically offset from the longitudinal axis of the low-pressure reservoir receiving chamber in the direction of an attachment face of the hydraulic unit for a pump motor.

By means of such a connection, the ventilation of the hydraulic unit of the invention, in its horizontal and vertical installed position relative to a longitudinal axis of the pump motor in a motor vehicle, can be facilitated.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
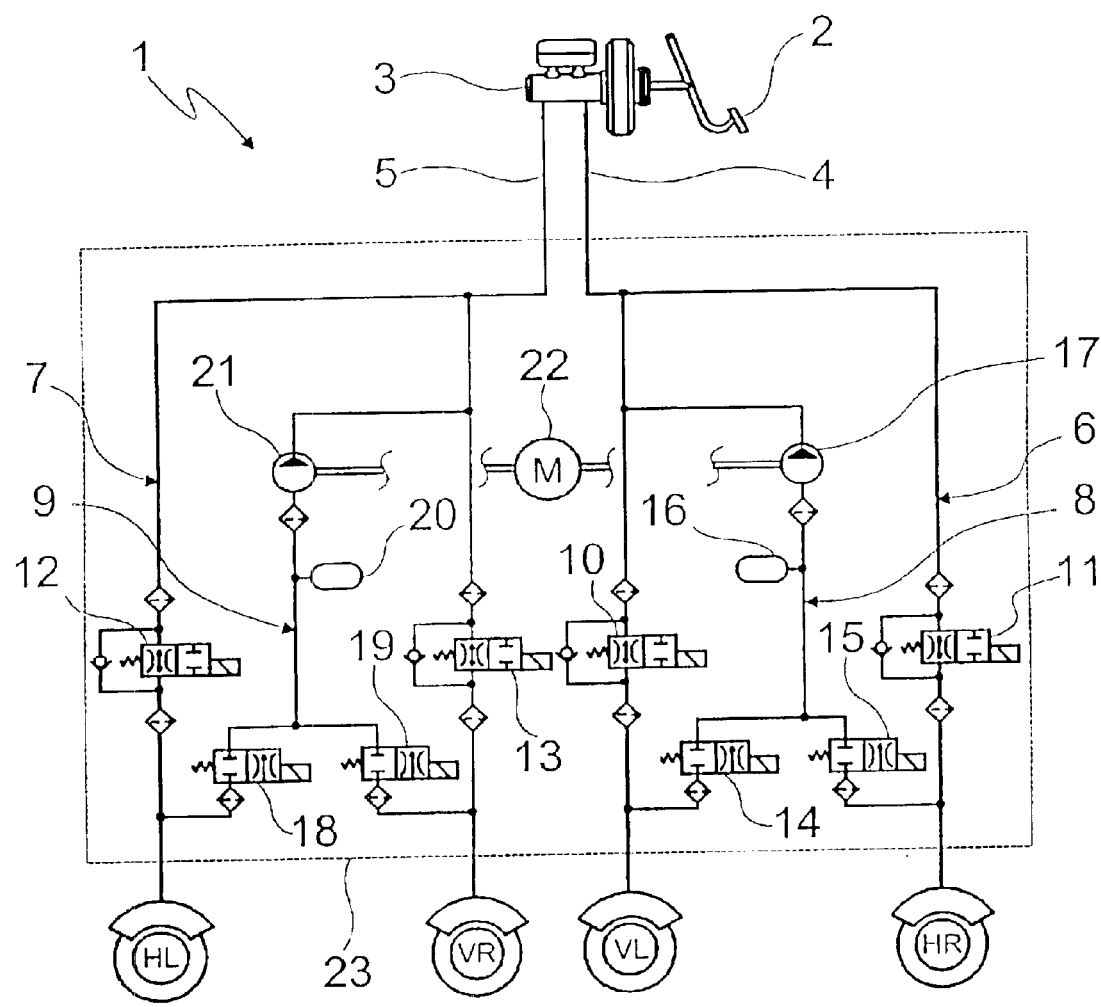
FIG. 1 shows a simplified hydraulic circuit diagram for a vehicle brake system, with elements disposed in a hydraulic unit of the invention.

FIG. 1 shows a simplified hydraulic circuit diagram for an anti-lock vehicle brake system 1, in which as a function of the position of a brake pedal 2 and of a brake pressure transducer or master cylinder 3, a brake pressure is introduced into a first brake circuit 4 and a second brake 5. The present vehicle brake system 1 is embodied as a diagonal brake system, in which the first brake circuit 4 acts on a wheel brake VL of a front wheel located at the left front of the applicable vehicle and on a wheel brake HR of a rear wheel diagonally opposite, in terms of a center axis of the vehicle, or in other words at the right back. The second brake circuit 5 correspondingly acts on a wheel brake VR of a front right wheel and a wheel brake HL of a diagonally opposed left rear wheel of the vehicle.

Each brake circuit 4 and 5 is subdivided into a primary circuit 6 and 7 and a secondary circuit 8 and 9, respectively. The primary circuit 6 of the first brake circuit 4 extends from the master cylinder 3 via an inlet valve 10 for the front left wheel brake VL to that wheel brake, and an inlet valve 11 for the right rear wheel brake HR leads to that wheel brake. Analogously, the primary circuit 7 of the second brake circuit 5 leads from the master cylinder 3 via an inlet valve 12 for the left rear wheel brake HL and an inlet valve 13 for the right front wheel brake VR to the associated wheel brakes.

The secondary circuit 8 of the first brake circuit 4 extends from one of the wheel brakes VL, HR of the first brake circuit 4 along an outlet valve 14, associated with the left front wheel brake VL, and an outlet valve 15 associated with the right rear wheel brake HR, and a low-pressure reservoir 16 to a return pump 17, by means of which a return of the hydraulic fluid located in the secondary circuit 8 into the primary circuit 6 is possible.

The secondary circuit 9 of the second brake circuit 5 is constructed analogously, with pressure lines that lead from the left rear wheel brake HL via an associated outlet valve 18 and from the right front wheel brake VR via an associated outlet valve 19 to a low-pressure reservoir 20, and with a return pump 21 downstream of the low-pressure reservoir 20. The return pumps 17 and 21 are driven by means of a pump motor 22, embodied in the present case with an eccentric element.

The embodiment of the inlet valves and outlet valves 10–15, 18 and 19 and their cooperation with the other elements of the brake circuits 4, 5 can be embodied in a manner known per se, as described for instance in German Patent Disclosure DE 195 31 468 A1.

Figure 2:
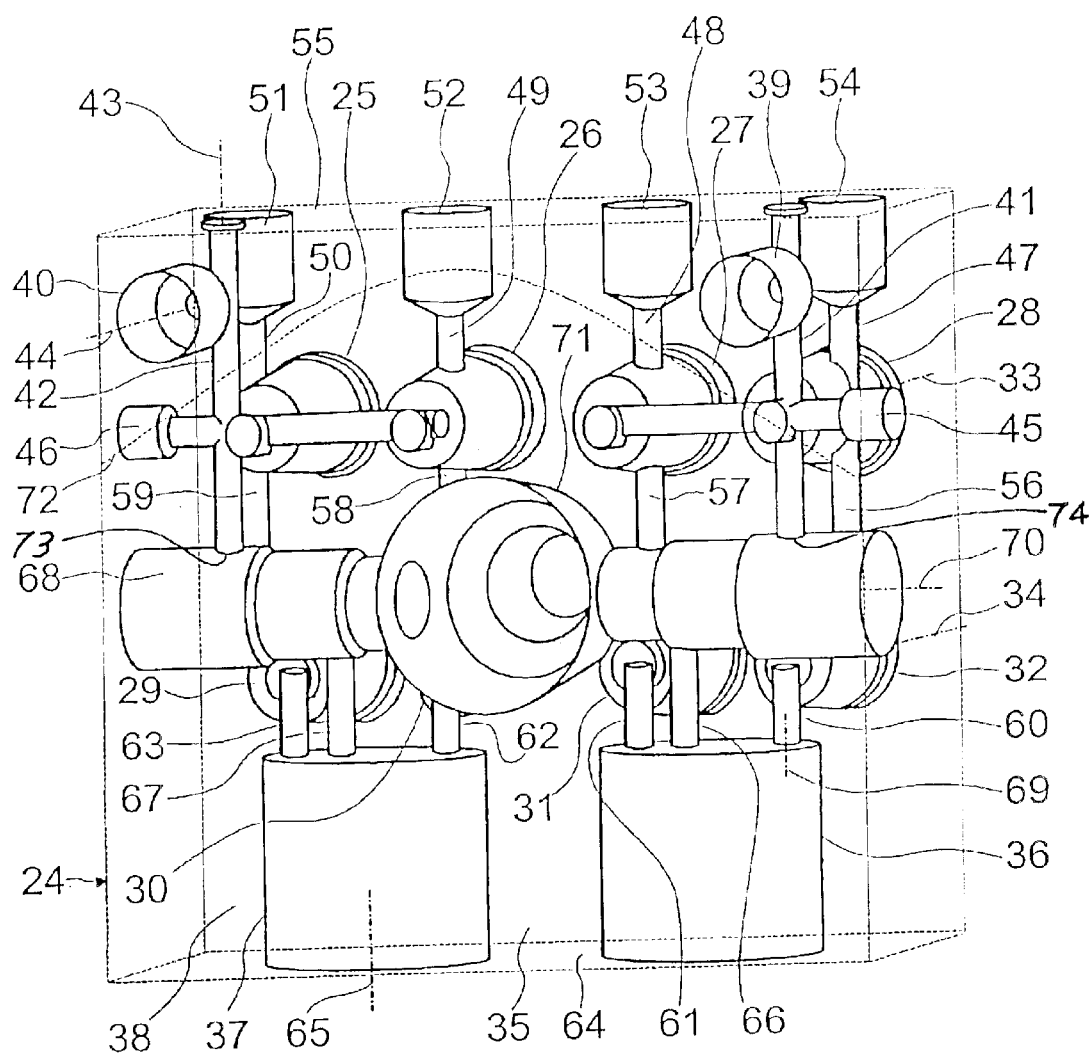
FIG. 2 is a highly schematic three-dimensional view of a housing block of the hydraulic unit of FIG. 1, with receiving chambers for elements to be installed in the hydraulic unit, and with connections among the receiving chambers.

For conducting the hydraulics between the master cylinder 3 and the wheel brakes HL, VR, VL and HR, a hydraulic unit 23 is provided, which has a housing block 24 schematically shown in FIG. 2.

As can be seen from FIG. 2, the housing block 24, for receiving a brake fluid pumped from the master cylinder 3 into the housing block 24 of the hydraulic unit 23, has a brake pressure transducer connection 39 for the first brake circuit 4 and a further brake pressure transducer connection 40 for the second brake circuit 5. The brake pressure transducer connections 39, 40 are bores that are made in the housing block 24 from the direction of an attachment face or flange face 38 of the hydraulic unit 23 for the pump motor 22. The brake pressure transducer connections 39, 40 each communicate via a respective bore 41 and 42, whose longitudinal axis 43 extends perpendicular to and offset from a longitudinal axis 44 of the brake pressure transducer connections 39, 40, communicate with a first row of valve receiving chambers 25–28 for receiving the inlet valves 10–13.

The bores 41 and 42 lead to a respective inlet valve receiving chambers 28 and 25, which communicates with a further inlet valve receiving chambers 27 and 26 of the same brake circuit 4 and 5, respectively, via a respective bore 45 and 46 oriented perpendicular to and branching off from the longitudinal axis 43 of the respective bore 41 and 42, From each of the inlet valve receiving chambers 25–28, a respective bore 47, 48, 49, 50 disposed axially parallel to the bores 41, 42 leads to an associated, coaxially embodied wheel brake connection 51–54. The wheel brake connections 51–54 are made in the housing block 24 from a face 55, which in FIG. 2 forms a top side and which extends perpendicular to the attachment face 38 from the pump motor 22, and these connections each lead to one of the wheel brakes HL, VR, VL, HR.

In addition, lines 56, 57, 58, 59 each lead from the respective inlet valve receiving chambers 25–28, in this case being disposed coaxially with the bores 47, 48, 49, 50 and in production terms representing a continuation of these bores, to valve receiving chambers 29–32 that are intended for receiving the outlet valve 14, 15, 18, 19.

The valve receiving chambers 29–32 for receiving the outlet valves 14, 15, 18, 19 are made in the housing block 24, like the valve receiving chambers 25–28 for receiving the inlet valves 10–13, in stepped fashion from a side 35 opposite the attachment face 38 for the pump motor 22, and are disposed in a second row, so that with respect to their longitudinal axes 33, the valve receiving chambers 25–28 of the first row are oriented axially parallel with the longitudinal axes 34 of the valve receiving chambers 29–32 of the second row that is parallel to the first row.

From each of the valve receiving chambers 29–32 for receiving the outlet valves 14, 15, 18, 19, a separate, direct connection 60, 61, 62, 63, embodied as a bore, leads to a respective low-pressure reservoir receiving chamber 36 and 37 that is intended to receive the low-pressure reservoir 16 and 20, respectively.

The low-pressure reservoir receiving chambers 36, 37, which are made into the housing block 24 in the form of circular bores from a face 64 that in FIG. 2 represents an underside, are disposed with their longitudinal axes 65 axially parallel with the bores 60–63 and perpendicular to the longitudinal axes 33, 34 of the valve receiving chambers 25–32.

From each of the low-pressure reservoir receiving chambers 36, 37, a further connection 66, 67, embodied as a separate bore, leads to a pump receiving chamber 68 for receiving the return pumps 17 and 21; a longitudinal axis 69 of these further bores 66, 67 is disposed axially parallel with the longitudinal axis 65 of the low-pressure reservoir receiving chambers 36, 37 and is offset eccentrically from that longitudinal axis in the direction of the attachment face 38 for the pump motor 22.

The pump receiving chamber 68 is disposed between the first row of valve receiving chambers 25–28 and the second row of valve receiving chambers 29–32 and is made in the housing block 24 in the form of a bore that tapers in stepped fashion in the direction of the middle; a longitudinal axis 70 of the pump receiving chamber 68 extends perpendicular to the longitudinal axes 33 and 34 of the respective valve receiving chambers 25–32.

A cup-shaped receiving chamber 71 discharges centrally into the pump receiving chamber 68; this chamber is let into the housing block 24 perpendicular to the longitudinal axis 69 of the pump receiving chamber 68 from the attachment face 38 for the pump motor 22, and an eccentric element of the pump motor 22 is disposed in it in the installed state in a manner known per se and as described for instance in DE 44 31 250 A1.

A contour course 72 indicated in FIG. 2 essentially indicates the position of the pump motor 22 that is flanged to the housing block 24.

As can also be seen from FIG. 2, the pump receiving chamber 68 has orifices 73 and 74 of the respective bores 41 and 42 that are driven into the housing block 24 and that thus connect the brake pressure transducer connections 39, 40 not only to the valve receiving chambers 25–28 of the inlet valves but also to the pump receiving chamber 68. It can optionally also be provided that dampers are disposed in the pump receiving chamber 68 in the region of the orifices 73, 74.

The foregoing relates to a preferred exemplary embodiment of the invention, it being understood that other variants and embodiments thereof are possible within the spirit and scope of the invention, the latter being defined by the appended claims.

We claim:

1. A hydraulic unit for an anti-lock vehicle brake system (1) having a housing block (24), comprising
a first row of valve receiving chambers (25, 26, 27, 28) for receiving inlet valves (10, 11, 12, 13), and a second row of valve receiving chambers (29, 30, 31, 32) for receiving outlet valves (14, 15, 18, 19);
a pump receiving chamber (68), whose longitudinal axis (70) extends at least approximately perpendicular to longitudinal axes (33, 34) of the valve receiving chambers (25–32) and between the longitudinal axes (33) of the valve receiving chambers (25, 26, 27, 28) of the first row and the longitudinal axes (34) of the valve receiving chambers (29, 30, 31, 32) of the second row;
low-pressure reservoir receiving chambers (36, 37), which are disposed on a side, remote from the pump receiving chamber (68), of the valve receiving chambers (29, 30, 31, 32) of the second row, and whose longitudinal axes (65) extend at least approximately perpendicular to the longitudinal axes (33, 34) of the valve receiving chambers (25–32) and to the longitudinal axis (70) of the pump receiving chamber (68); and
a separate, direct connection (60, 61, 62, 63) between each valve receiving chamber (29, 30, 31, 32) of an outlet valve (14, 15, 18, 19) and an associated low-pressure reservoir receiving chamber (36, 37).

2. The hydraulic unit according to claim 1, wherein the connection between the valve receiving chamber (29, 30, 31, 32) of the outlet valve (14, 15, 18, 19) and the associated low-pressure reservoir receiving chamber (36, 37) is embodied as a straight bore (60, 61, 62, 63).

3. The hydraulic unit according to claim 1, further comprising a separate connection (66, 67) between the low-pressure reservoir receiving chamber (36, 37) and the pump receiving chamber (68).

4. The hydraulic unit according to claim 2, further comprising a separate connection (66, 67) between the low-pressure reservoir receiving chamber (36, 37) and the pump receiving chamber (68).

5. The hydraulic unit according to claim 3, wherein the longitudinal axis (69) of the separate connection (66, 67) is offset axially parallel to the longitudinal axis (65) of the low-pressure reservoir receiving chamber (36, 37) in the direction of an attachment face (38) of the hydraulic unit (23) for a pump motor (22).

6. The hydraulic unit according to claim 4, wherein the longitudinal axis (69) of the separate connection (66, 67) is offset axially parallel to the longitudinal axis (65) of the low-pressure reservoir receiving chamber (36, 37) in the direction of an attachment face (38) of the hydraulic unit (23) for a pump motor (22).

7. The hydraulic unit according to claim 1, further comprising two valve receiving chambers (29, 30; 31, 32, respectively) for one outlet valve (14, 15, 18, 19) associated with each of the brake circuits (4, 5) for installation in a diagonal brake system (1) with two brake circuits (4, 5).

8. The hydraulic unit according to claim 2, further comprising two valve receiving chambers (29, 30; 31, 32, respectively) for one outlet valve (14, 15, 18, 19) associated with each of the brake circuits (4, 5) for installation in a diagonal brake system (1) with two brake circuits (4, 5).

9. The hydraulic unit according to claim 3, further comprising two valve receiving chambers (29, 30; 31, 32, respectively) for one outlet valve (14, 15, 18, 19) associated with each of the brake circuits (4, 5) for installation in a diagonal brake system (1) with two brake circuits (4, 5).

10. The hydraulic unit according to claim 5, further comprising two valve receiving chambers (29, 30; 31, 32, respectively) for one outlet valve (14, 15, 18, 19) associated with each of the brake circuits (4, 5) for installation in a diagonal brake system (1) with two brake circuits (4, 5).

11. The hydraulic unit according to claim 1, wherein the inlet valve (10, 11, 12, 13) are disposed in a primary circuit (6, 7) between a brake pressure transducer (3) and a wheel brake (HL, HR, VL, VR).

12. The hydraulic unit according to claim 2, wherein the inlet valves (10, 11, 12, 13) are disposed in a primary circuit (6, 7) between a brake pressure transducer (3) and a wheel brake (HL, HR, VL, VR).

13. The hydraulic unit according to claim 3, wherein the inlet valves (10, 11, 12, 13) are disposed in a primary circuit (6, 7) between a brake pressure transducer (3) and a wheel brake (HL, HR, VL, VR).

14. The hydraulic unit according to claim 5, wherein the inlet valves (10, 11, 12, 13) are disposed in a primary circuit (6, 7) between a brake pressure transducer (3) and a wheel brake (HL, HR, VL, VR).

15. The hydraulic unit according to claim 7, wherein the inlet valves (10, 11, 12, 13) are disposed in a primary circuit (6, 7) between a brake pressure transducer (3) and a wheel brake (HL, HR, VL, VR).

16. The hydraulic unit according to claim 1, wherein the outlet valves (14, 15, 18, 19) are disposed in a secondary circuit (8, 9) between a wheel brake (HL, HR, VL, VR) and a low-pressure reservoir (16, 20) preceding a return pump (17, 21).

17. The hydraulic unit according to claim 2, wherein the outlet valves (14, 15, 18, 19) are disposed in a secondary circuit (8, 9) between a wheel brake (HL, HR, VL, VR) and a low-pressure reservoir (16, 20) preceding a return pump (17, 21).

18. The hydraulic unit according to claim 3, wherein the outlet valves (14, 15, 18, 19) are disposed in a secondary (8, 9) between a wheel brake (HL, HR, VL, VR) and a low-pressure reservoir (16, 20) preceding a return pump (17, 21).

19. The hydraulic unit according to claim 11, wherein the outlet valves (14, 15, 18, 19) are disposed in a secondary (8, 9) between a wheel brake (HL, HR, VL, VR) and a low-pressure reservoir (16, 20) preceding a return pump (17, 21).

* * * * *